US007110746B2

(12) United States Patent
Herzog et al.

(10) Patent No.: US 7,110,746 B2
(45) Date of Patent: Sep. 19, 2006

(54) METHOD FOR PROVIDING AND PROCESSING LOCALITY INFORMATION IN SWITCHED NETWORKS

(75) Inventors: Uwe Herzog, Heidelberg (DE); Heiko Dassow, Griesheim (DE); Klaus-Peter Zeffler, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 376 days.

(21) Appl. No.: 10/169,487

(22) PCT Filed: Dec. 22, 2000

(86) PCT No.: PCT/EP00/13213

§ 371 (c)(1),
(2), (4) Date: Jul. 3, 2002

(87) PCT Pub. No.: WO01/52562

PCT Pub. Date: Jul. 19, 2001

(65) Prior Publication Data

US 2002/0193123 A1    Dec. 19, 2002

(30) Foreign Application Priority Data

Jan. 12, 2000   (DE)   .................. 100 00 888

(51) Int. Cl.
   H04M 1/66   (2006.01)
   H04M 1/68   (2006.01)
   H04M 3/16   (2006.01)
   H04Q 7/20   (2006.01)
(52) U.S. Cl. ...................... 455/411; 455/461
(58) Field of Classification Search ............... 455/456, 455/461, 426, 411; 370/349, 352

See application file for complete search history.

(56) References Cited

U.S. PATENT DOCUMENTS

| 5,353,331 | A | * | 10/1994 | Emery et al. ............ 455/461 |
| 5,583,917 | A |   | 12/1996 | Jonsson .................. 379/60 |
| 5,670,950 | A | * | 9/1997  | Otsuka ................... 455/411 |
| 5,805,997 | A | * | 9/1998  | Farris .................... 455/461 |
| 6,594,253 | B1| * | 7/2003  | Sallberg et al. .......... 370/349 |
| 6,747,970 | B1| * | 6/2004  | Lamb et al. ............. 370/352 |
| 2002/0193123 | A1 | * | 12/2002 | Herzog et al. ........... 455/456 |

FOREIGN PATENT DOCUMENTS

| DE | 4441753  | 6/1995  |
| DE | 19646954 | 8/1998  |
| DE | 19809212 | 9/1999  |
| DE | 19819582 | 11/1999 |

(Continued)

OTHER PUBLICATIONS

Francis et al."Evolutionary Mobility and Service Support in DECT Access Networks", Oct. 1997, pp. 1488-1497 in IEEE Journal on Selected Areas in Communications, vol. 15, No. 8.

(Continued)

Primary Examiner—William D. Cumming
(74) Attorney, Agent, or Firm—Darby & Darby

(57) ABSTRACT

The present invention provides a method for providing locality information in a plurality of switched networks of different network types. The method includes transmitting network-specific information of a caller via a signaling protocol of a service logic located on a service platform. Using the transmitted network-specific information of the caller, a current locality information of the caller is determined by a network-specific location information server. The current locality information is provided in a uniform manner outside of the signaling protocol.

15 Claims, 2 Drawing Sheets

FOREIGN PATENT DOCUMENTS

| | | |
|---|---|---|
| EP | 0911643 | 4/1999 |
| WO | 9607110 | 3/1996 |
| WO | 9810538 | 3/1998 |
| WO | 9821703 | 5/1998 |
| WO | 9905877 | 2/1999 |
| WO | 9927742 | 6/1999 |
| WO | 9955102 | 10/1999 |
| WO | 9956326 | 11/1999 |

OTHER PUBLICATIONS

ITU-T Recommendation Q1221 (Sep. 3, 1997), Series Q: Switching and Signalling, Intelligent Network, "Introduction to Intelligent Network Capability Set 2".

ITU-T Recommendation H.323 (Jul. 2003), Series H: Audiovisual and Multimedia Systems, Infrastructure of Audiovisual Services—Systems and Terminal Equipment for Audiovisual Services, "Packet-based multimedia communications systems".

* cited by examiner

METHOD FOR PROVIDING AND PROCESSING LOCALITY INFORMATION IN SWITCHED NETWORKS

BACKGROUND

The present invention relates to a method for providing and processing locality information in switched networks, such as fixed networks, mobile telephone networks, Internet or technically equivalent networks, in particular, at the appropriate interface to the respective service logic.

In switching technology, methods and architectures are known for switching a call in a connection-oriented network as a function of its origin, as is described in ITU-T publication Q1221 (09,97) under the title "Introduction to Intelligent Network Capability Set 2". In this context, the positional information used for this method consists exclusively of the current relation of the subscriber within a structured switched network. Thus, for example, an emergency call number can be configured within the network in such a manner that the call is forwarded to a call center servicing the local telephone network.

Also known are methods in which, after the call has been put through, geographic location information is transmitted from the terminal device to a server at the destination subscriber end, such as the ADAC emergency kit, for example, to make it easier to locate a vehicle in the case of an accident or breakdown.

Publications of the PARLAY Group, such as the Parlay News Page of Oct. 22, 1999 and the Press Release of Jun. 15, 1999 as well as the publication "Parlay API-Business Benefits White Paper" of Jun. 11, 1999 describe how information on the whereabouts of the caller is provided to a program implementing the service logic for through-connection to the target subscriber, in particular, for calls from mobile telephony networks or from the Internet. Locality information can be obtained, for example, using the Global Positioning System (GPS), and forwarded to the service logic.

The present origin-dependent routing of connections has the disadvantage that no uniform method for providing this location information exists which is compatible with current network architectures. An adaptation and modification of the existing signaling protocols in the respective networks, such as the Intelligent Network Application Protocol (INAP), the Mobile Application Protocol (MAP), the Camel Application Protocol (CAP), the Wireless Application Protocol (WAP) and the protocol for implementing data communication services in IP networks (H.323) according to ITU standard, are extremely tedious and difficult to carry out, thus requiring considerable technical effort.

SUMMARY OF THE INVENTION

Therefore, an object of the present invention is to provide a method for providing and processing locality information in switched networks which allows location information from the most different networks, such as the Public Switched Telephone Network (PSTN), the Integrated Service Digital Network (ISDN), the Global System for Mobile Communication (GSM), the Internet and other technically equivalent networks, to be provided to the service logic in a uniform manner, namely without modifying existing signaling protocols and, moreover, the intention being to allow different networks having different methods for determining coordinates to be interconnected, implementing a cross-network service.

The present invention provides a method for providing locality information in a plurality of switched networks of different network types. The method includes transmitting network-specific information of a caller via a signaling protocol of a service logic located on a service platform. Using the transmitted network-specific information of the caller, a current locality information of the caller is determined by a network-specific location information server. The current locality information is provided in a uniform manner outside of the signaling protocol.

The method disclosed herein allows locality information from different networks, i.e., networks of different types and technologies, to be passed on to a service logic which is responsible for the implementation of the telecommunications service.

Locality information per se allows a connection to be switched through to different destinations in a network on the basis of a geographic position determination of the subscriber initiating the connection.

Using the uniform method for providing and processing locality information in switched networks proposed herein, positional information is made available in a uniform manner.

There is no need to change existing protocols for service control. Moreover, it is possible to provide positional information from arbitrary networks. Due to the selected architecture and the separation in the transmission of signal information and the transmission of geographical coordinates, it is possible in a particularly simplified manner to interconnect different networks having different methods for determining coordinates, implementing a cross-network service.

The position determination accuracy can vary as a function of the selected method. It can be based, for example, on:

location of the antenna mast or sector center of the radio cell in mobile telephone networks;

exact geographic position by determination using GPS;

location of the Internet access node, firewalls, etc.

The required positional information must be made available at the appropriate interface to the service logic. The positional information can be obtained in different ways, as some examples will show:

In mobile telephone networks by local management access to the antenna configuration of the radio cell of the call;

by transmission of the information obtained with GPS in the mobile terminal device using existing protocols such as WAP.

In the fixed network by access to subscriber line data at the respective network operator's site, such as with German Telekom, described in IV-application KONTESS ORKA, ZIP/PR990521.5B.ORKA.002, to allow accurate position determination.

In the Internet by tracing functionalities for backtracing (trace route), possibly, in combination with a record of locations of Internet nodes.

The conversion of the raw location data into a format according to the syntax and semantics to be provided can take place in a central server or already before, for example, by preprocessing in the respective source networks.

Further advantages, features and possible uses of the present invention, in particular, of the uniform method for providing and processing locality information in switched networks, follow from the following description in conjunction with the exemplary embodiment shown in the drawing.

BRIEF DESCRIPTION OF THE DRAWING

In the following, the present invention will be explained in greater detail in the light of an exemplary embodiment shown in the drawings. The terms and associated reference symbols specified in the list of reference symbols given at the back are used in the description, in the patent claims, in the abstract, and in the drawings.

In the drawings.

DETAILED DESCRIPTION

Figure 1:
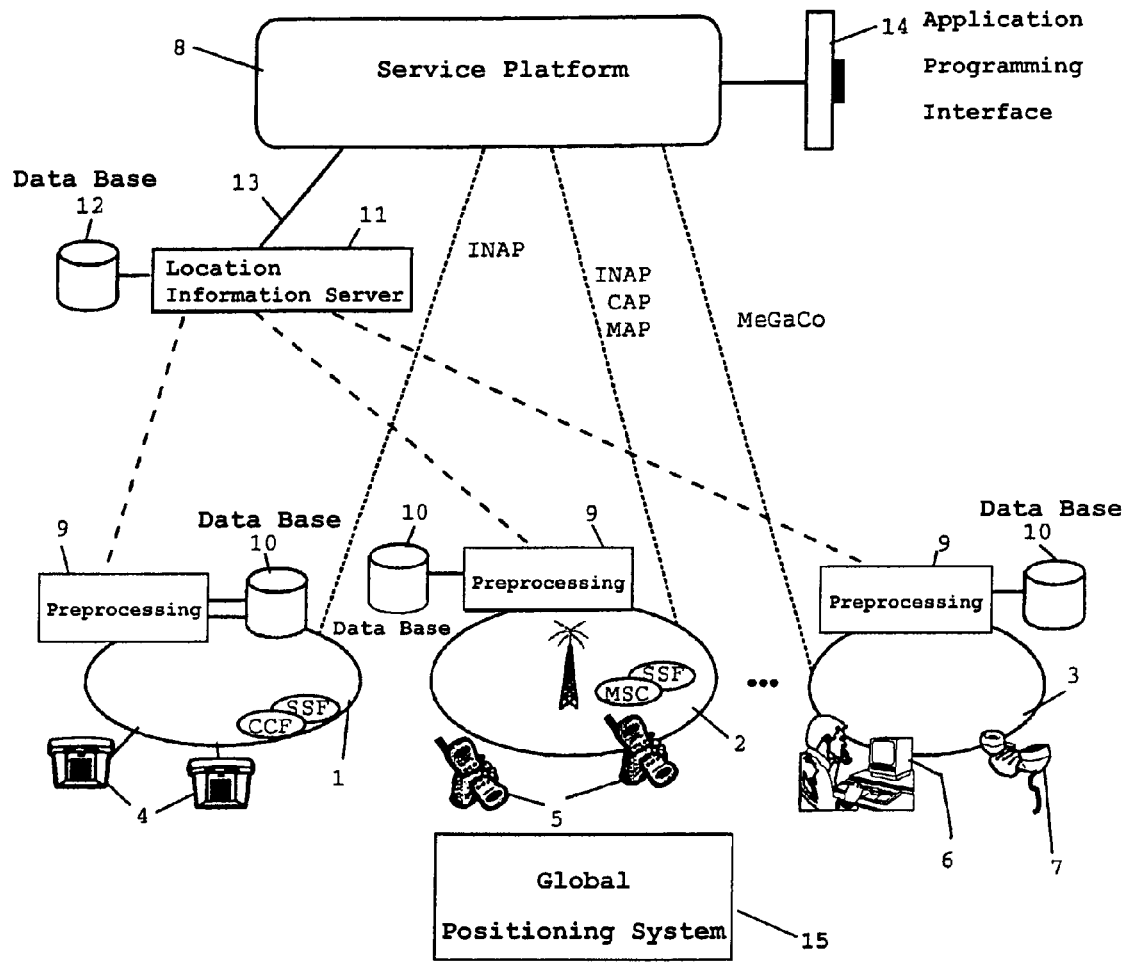
FIG. 1 schematically represents a network architecture.

The network architecture shown in FIG. 1 depicts a common service platform 8, such as IN-SCP, that is, the service control point SCP of an intelligent network IN, having an application programming interface (API) 14, for example, from the PARLAY Group, for fixed network 1 as a Public Switched Telephone Network PSTN, a mobile telephone network 2 and Internet 3. In this context, networks 1 through 3 are connected to respective terminal devices such as telephones 4, mobile telephones 5, personal computers 6 and couplers 7 of the respective networks 1 through 3. Fixed network 1 is provided with a call control point function CCF and with a service switching function SSF. Mobile telephone network 2, in turn, is provided with a service switching function SSF and a mobile switching center MSC. Fixed network 1 is connected to service platform 8 via an Intelligent Network Application Protocol INAP. Mobile telephone network 2 is connected to service platform 8 via an Intelligent Network Application Protocol INAP, a Camel Application Protocol CAP and Mobile Application Protocol MAP. Internet 3 is connected via known signaling or control protocols such as MeGaCo or other. Network-specific information of a caller is accordingly transmitted to service platform 8 via a signaling protocol of service logic resident on the server.

Moreover, each of networks 1 through 3 possesses a preprocessing unit 9 with an associated data base 10, all of which being connected to a location information server 11 which features a separate data base 12 and is connected to service platform 8 via a link 13.

It should be observed that the exemplary embodiment in FIG. 1 represents only an overview of the described scenario. The locality information is obtained from the in this case, for example, three depicted different networks 1 through 3 and provided to location information server 11 with associated data base 12. In this context, no modification of existing signaling or control protocols for the purpose of transmitting locality information takes place. Optionally, however, it is possible to use existing protocols to transparently transmit locality information. Preprocessing 9 and, possibly, accesses to data bases 10 are possible. As noted above, the service logic is located on service platform 8. From there, it can access location information server 11 and thus, the desired locality information, based on the transmitted network-specific information of a caller. The locality information is provided by location information server 11 in a uniform manner outside of the signaling protocol of the service logic. The number and type of the networks which are connected to service platform 8, in this example networks 1 through 3, and their interconnection are basically unimportant because further variants are easily possible without inventive activity. The here mentioned Parlay interface 14 can, of course, also be replaced with another suitable interface and serves here only as an example.

Figure 2:
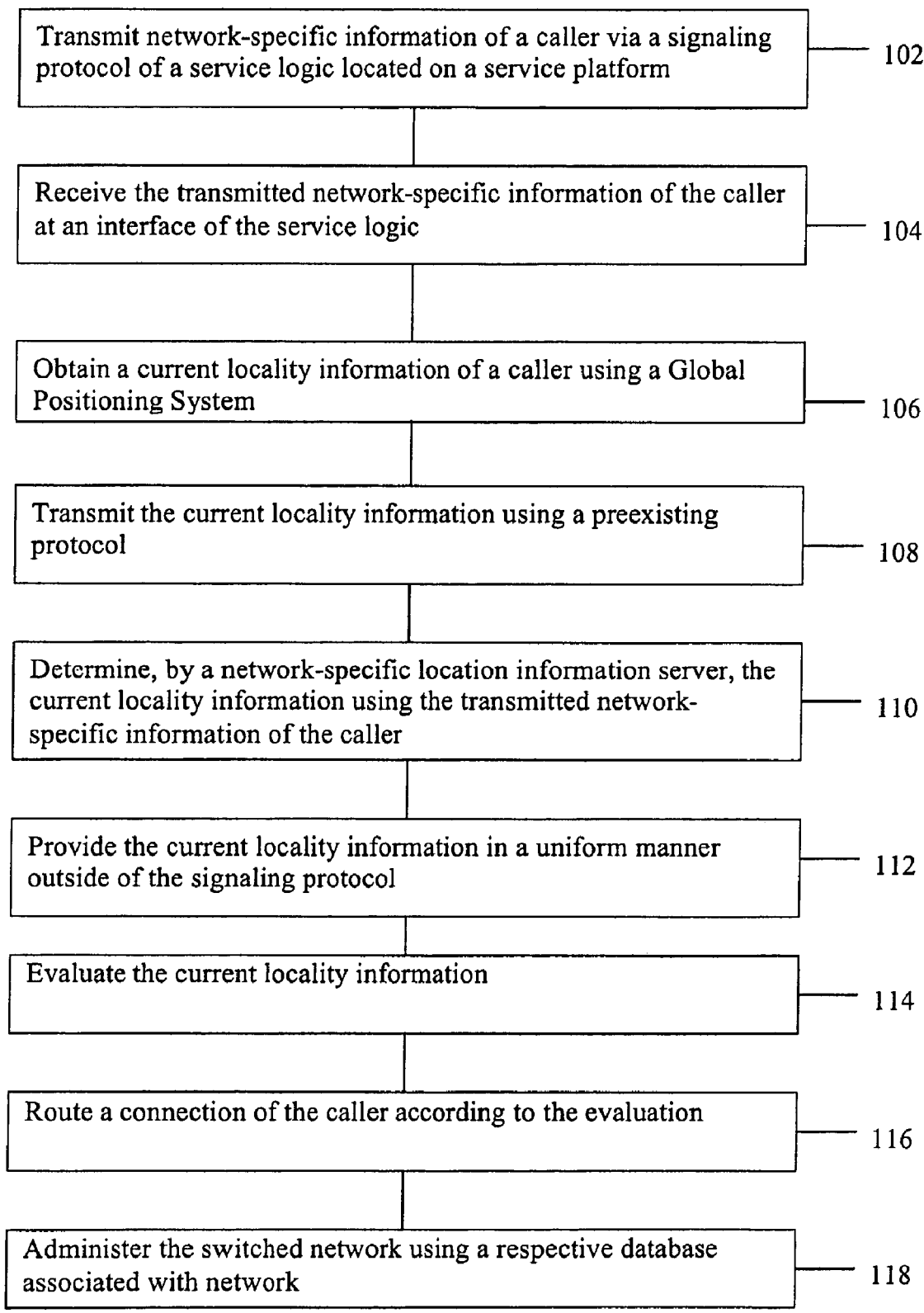
FIG. 2 shows a flowchart of a method providing locality information in a plurality of switched networks of different network types.

FIG. 2 shows a flowchart of a method providing locality information in a plurality of switched networks of different network types. Network-specific information of a caller is transmitted via a signaling protocol of a service logic located on a service platform (see block 102). The transmitted network-specific information of the caller is received at an interface of the service logic (see block 104). A current locality information of the caller is obtained using a Global Positioning System (see block 106). The current locality information is transmitted using a preexisting protocol (see block 108). Using the transmitted network-specific information of the caller, the current locality information is determined by a network-specific location information server (see block 110). The current locality information is provided in a uniform manner outside of the signaling protocol (see block 112). The current locality information is evaluated (see block 114), and a connection of the caller is routed according to the evaluation (see block 116). The switched network is administered using a respective database associated with network (see block 118).

The provision of location information of the caller by the here described uniform method for providing and processing locality information in switched networks considerably improves the cost-effectiveness ratio, the efficiency, the acceptance and the spread of the use of location information for telecommunications services. Moreover, the availability of positional information on the location of the caller is thereby accomplished in a technically reliable and economically interesting manner for a series of services of fundamental or considerable additional importance as, for example, routing according to the exact origin to find the appropriate contact person, immediate knowledge of the location of the caller for prompt assistance, delivery of goods to the location of the caller, etc.

What is claimed is:

1. A method for providing locality information in a plurality of switched networks of different network types, the method comprising:
   transmitting network-specific information of a caller via a signaling protocol of a service logic located on a service platform;
   determining, by a network-specific location information server, a current locality information of the caller using the transmitted network-specific information of the caller; and
   providing the current locality information in a uniform manner outside of the signaling protocol;
   wherein the current locality information includes geographical coordinates.

2. The method as recited in claim 1 wherein the providing of the current locality information is performed by the network specific location information server.

3. The method as recited in claim 1 wherein the providing of the current locality information includes providing the current locality information at an interface to the service logic.

4. The method as recited in claim 1, further comprising:
   evaluating the current locality information; and
   routing a connection of the caller according to the evaluation.

5. The method as recited in claim 4, wherein the evaluation includes determining, by performing a database query operation, a customer destination for the locality information.

6. The method as recited in claim 5, wherein the routing of the connection includes routing the connection to a customer destination other than a customer destination call number of the caller.

7. The method as recited in claim 6, wherein the routing includes routing the connection to the appropriate customer destination.

8. The method as recited in claim 1, wherein the determining of the current locality information includes carrying out an online access to a base.

9. The method as recited in claim 8, further comprising administering the switched network using a respective database associated with network.

10. A method for
providing locality information in a plurality of switched networks of different network types, the method comprising:
transmitting network-specific information of a caller via a signaling protocol of a service logic located on a service platform;
determining, by a network-specific location information server, a current locality information of the caller using the transmitted network-specific information of the caller; and
providing the current locality information in a uniform manner outside of the signaling protocol;
wherein the current locality information includes an address; and
wherein the address includes at least one of country, city, district, street, and street number.

11. The method as recited in claim 1, wherein the locality information is also made available at an interface for external applications.

12. The method as recited in claim 1, wherein the switched network is a mobile telephone network and the providing of the current locality information is performed using a local management access to an antenna configuration of a radio cell of the telephone call.

13. A method for
providing locality information in a plurality of switched networks of different network types, the method comprising:
transmitting network-specific information of a caller via a signaling protocol of a service logic located on a service platform;
determining, by a network-specific location information server, a current locality information of the caller using the transmitted network-specific information of the caller; and
providing the current locality information in a uniform manner outside of the signaling protocol;
wherein the switched network is a fixed telephone network and the providing of the current locality information includes providing the current locality information to an interface to the service logic using an access to subscriber line data located at a site of a network operator associated with the fixed telephone network.

14. A method for
providing locality information in a plurality of switched networks of different network types, the method comprising:
transmitting network-specific information of a caller via a signaling protocol of a service logic located on a service platform;
determining, by a network-specific location information server, a current locality information of the caller using the transmitted network-specific information of the caller; and
providing the current locality information in a uniform manner outside of the signaling protocol;
wherein the switched network is an internet network and the providing of the current locality information includes providing the current locality information to an interface to the service logic using a tracing of functionalities for backtracking.

15. The method as recited in claim 14 wherein the providing of the current locality information further includes using a record of locations of internet nodes.

* * * * *